HIGH FREQUENCY MAGNETIC HEAD

Filed Oct. 11, 1965 3 Sheets-Sheet 1

PRIOR ART

INVENTOR.
ROBERT A. SCHNEIDER
BY
Christie, Parker & Hale
ATTORNEYS.

HIGH FREQUENCY MAGNETIC HEAD

Filed Oct. 11, 1965 3 Sheets-Sheet 2

INVENTOR.
ROBERT A. SCHNEIDER
BY
Christie, Parker & Hale
ATTORNEYS.

HIGH FREQUENCY MAGNETIC HEAD

Filed Oct. 11, 1965

INVENTOR.
ROBERT A. SCHNEIDER
BY
Christie, Parker & Hale
ATTORNEYS.

United States Patent Office 3,417,209

Patented Dec. 17, 1968

3,417,209

HIGH FREQUENCY MAGNETIC HEAD

Robert A. Schneider, Arcadia, Calif., assignor to Consolidated Electrodynamics Corporation, Pasadena, Calif., a corporation of California Filed Oct. 11, 1965, Ser. No. 494,765
4 Claims. (Cl. 179—100.2)

This invention relates in general to a new and improved head and bracket structure for recovering high frequency signals on a magnetic storage medium and to a method of assembly which yields low reluctance and minimum flux leakage paths for recovered signal flux. In particular this invention relates to a high frequency head of a new and improved shape and method of assembly which provides a magnetic circuit free of impurities such as glue lines between a pole tip and a pole piece.

Modern technology has continually sought new and improved magnetic circuit materials in attempts to provide the sensitive signal handling techniques presently required in today's magnetic storage and retrieval systems. These new and improved materials have increased the high frequency capabilities of magnetic systems to a large extent, but even with such improved materials the reluctance of the magnetic circuit and the inherent flux leakage paths in such circuits represent limiting factors which must be overcome to improve the range of high frequency signals which may be stored on the magnetic mediums. Typical of such new and improved materials are disclosed and claimed in my application having Ser. No. 494,475, filed on even date herewith, and assigned to the same assignee as the present application.

The principles of the invention of this application are particularly applicable to such improved materials, but are equally applicable to other known prior art materials in that this invention defines an improved head structure, and a new method of assembly which is capable of accurately recovering stored signals having frequencies up to six megacycles and higher. The structure and method of this invention achieve this increase in frequency sensitivity without significantly increasing the cost of manufacture or assembly, and at the same time provide a head shape which is compact, simple in design, and which exhibits a wear life considerably longer than prior art heads.

It is a well known relationship that the shortest wavelength which must be handled by a signal recovery head for any given magnetic storage system is defined by the speed of the storage medium relative to the head divided by the highest frequency of the signal stored on the medium to be read. Storage medium speeds in the order of 120 inches per second are economically available and are generally employed. If the highest signal frequency to be recovered is 1.5 megacycles, then this shortest wavelength is approximately 80 millionths of an inch. This wavelength is represented in a signal track on the storage medium as magnetic particles 80 millionths of an inch wide. If the signal frequency is increased to six megacycles the magnetic particles are a mere 20 millionths of an inch in width. When wave lengths of such short duration pass across a gap in a magnetic circuit for that signal track it is absolutely essential that the magnetic circuit provide the lowest possible reluctance to induced flux, and resist to as high a degree as possible any flux leakage across the gap in the magnetic circuit, because each induced signal is minutely weak and any reluctance or leakage further reduces the signal strength to the point that the entire system's operation is adversely affected.

Conventional head structures and prior art methods of assembly, up to the time of this invention, have not produced a magnetic head in as reliable and economical manner as does this invention. I have discovered that, in general, prior art magnetic circuits and construction methods using pole tip design have unnecessarily inserted reluctance increasing material in the form of glue layers at critical spots in the magnetic circuits; and that such circuits, particularly the gapped portions thereof, are so shaped that in many instances leakage across the gap is promoted rather than hindered.

The high frequency head of this invention and the methods of assembly and construction for this high frequency head avoids the above-mentioned disadvantages of the prior art and exhibits a low reluctance path having an increased resistance to flux leakage. The head of this invention is capable of satisfactory recovery of the exceedingly short wave lengths found in high frequency operations. In the high frequency head of this invention the head housing bracket for housing as many magnetic circuits as there are tracks of a plural track tape to be read, includes a countersunk void located on the surface of the bracket nearest to the tape passing location. This countersunk region allows magnetic pole pieces, and particularly the signal recovery coils wound around these pole pieces to be housed at a location which is closer to the tape being read than does the prior art. In addition, an improved broad-based, inverted, V-shaped opening is employed near the peaked portion of the magnetic pole pieces. This V-shaped opening produces a pair of opposed points which are located at the gap, formed by the magnetic pole tips. These pole pieces at their upper surface extend fully along the length of the pole tip pieces and present a low reluctance path for the short wave lengths of high frequency signals and at the same time further increase resistance to flux leakage between the openings in the magnetic pole pieces. These pole pieces are seated in a head housing bracket having a countersunk void at the area of the inverted V-shaped opening. An inlet and outlet port in each end of the head housing bracket communicates with the countersunk void and provides an inlet for pressurized potting material. This material, after the pole pieces, the pole tip support plates, the pole tips and windings have been assembled, fills the countersunk void and rigidly fixes these circuits in place.

The method of assembly and construction of this invention eliminates any objectionable nonmagnetic materials in the magnetic circuit such as glue regions which are present in the prior art assembly methods. In such prior art assembly methods a nonmagnetic glue layer is introduced between each pole tip and its associated pole piece. This glue layer represents a high reluctance area which is located immediately between the exposed portion of the pole tip which comes in contact with the tape to be read and the main body of the magnetic circuit as represented by the larger pole pieces. This nonmagnetic, high-reluctance material presents an undesirable path for induced flux to the extent that flux leakage across the gap in the pole tips is increased. The overall signal strength which is to be recovered by windings on the pole pieces is thus considerably reduced.

In accordance with the principles of this invention a tip supporting plate is slotted and is lapped prior to the insertion of any magnetic pole tips in the slots of the tip support plate. These tips are cemented in the tip plate and are positioned in the slots such that a portion of the tip extends above the previously lapped surface of the support plate. The head housing bracket, which has a plurality of magnetic pole pieces alignedly inserted in parallel slots in the bracket spaced so as to match each of the pole tip members in the pole tip support plate, is next lapped flat so that edges of the pole pieces are exposed in the lapped surface. Thereafter, the tip support plate is positioned on the head bracket so that the downwardly extending edges of the pole tips are seated against exposed edges of the magnetic pole pieces. These pieces are held in place in this contacting position, a fillet of epoxy resin or other binding material is positioned above the channels formed between the tip support plate and the lapped surface of the bracket structure, and thereafter the entire head assembly is warmed to the curing point of the binding material. This material at its curing temperature turns to a fluid state and is drawn, by capillary action, into the channels. Once cooled and allowed to set the tip support plate is bonded directly to the base support plate by the cured epoxy. The pole tips and the pole pieces, in accordance with this method of assembly, are joined at their edges in a unitary magnetic circuit which is formed completely free of any nonmagnetic glue material.

The foregoing principles and features of this invention may more fully be appreciated by reference to the accompanying drawing in which.

Figure 1A:
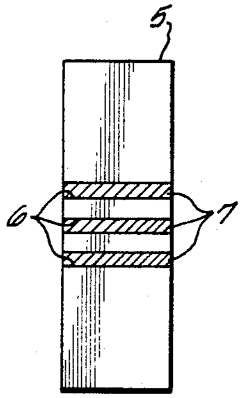
FIGS. 1A through FIG. 1E represent a typical prior art head structure and method of assembly.

In FIG. 1A of the prior art a flat rectangular tip support plate 5 has a plurality of parallel slots 6 cut across the width of plate 5. These slots 6 receive an equal number of magnetic pole tips 7 depicted as magnetic by the cross-hatched areas. These pole tips 7 are held in the parallel slots 6 by any suitable cement. The tip support plate 5, of course, is chosen from a nonmagnetic material in order that each of the tips 7 may be magnetically isolated from each other.

With the tips 7 cemented in place, the next primary step in the prior art method is to lap grind the tip support plate 5. This lapping, as it is called, may be accomplished by any of the well known lapping techniques. Numerous such lapping techniques exist, and the one depicted in FIG. 1B merely represents the principles of one such lapping operation, without describing in detail the numerous critical tolerance requirements for such lapping operations.

Figure 1B:
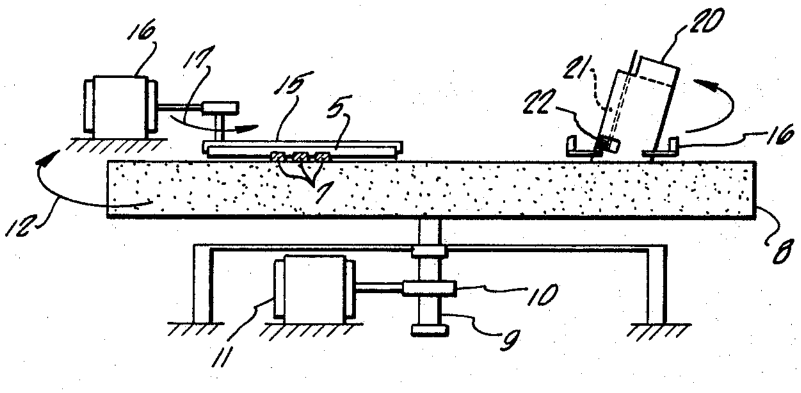

As shown in FIG. 1B an abrasive wheel 8 is rotatably mounted on a bearing-mounted spindle 9 having a pulley drive 10 that is belt connected to a motor 11. The rotation of the abrasive wheel 8 may be in the direction shown by arrow 12. The tip support plate 5 with tips 7 cemented in place in slots 6 is mounted in a suitable lapping jig 15, which in turn is driven by a motor 16 through a pulley drive in a manner well known in the lapping art. As shown by arrow 17, the material to be lapped is normally driven in a direction of rotation opposite to that of the grinding wheel 8. These lapping operations may extend through numerous different processes which involve different grade abrasive wheels until the surface being lapped achieves a true flat plane of any desired smoothness and polish.

Figure 1C:
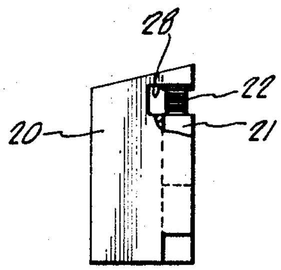

In a similar manner, a pole piece support assembly 20, which is shown in a side elevation in FIG. 1C, is also shown in a lapping jig 16 which is similar to jig 15 but not fully shown. Pole piece support assembly 20 is one-half of the head housing bracket of FIG. 1D. One pole piece 21 of the pole piece pair of FIG. 1E is mounted in slots cut in one pole piece support 20 of a pair, and pole piece 21 is held in place by cement or any other suitable binding agent.

Figure 1D:
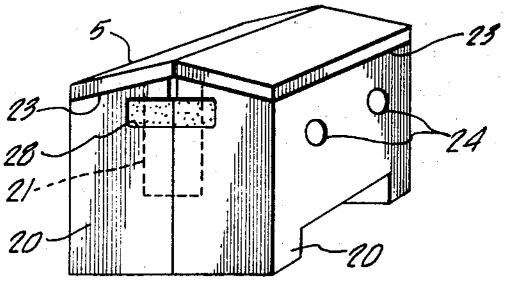

This pole piece support assembly 20, pole piece 21, and winding 22 once assembled as shown in FIG. 1B are subjected to a lapping operation until a flat plane surface for receiving the lapped tip support plate 5 and pole tips 7 is achieved. In this lapped surface an edge portion of pole piece 21 is exposed, and it lies in the same plane as the flat surface. A complete head assembly requires a pair of lapped pole piece supports 20 and a pair of lapped pole tip supports 5. These tip support plates 5 are secured to the upper lapped portion of the pole piece support 20 as shown in FIG. 1D such that the lower side of the lapped tip 7 aligns with and is separated from the upper edge portion of the pole piece support assembly 20 and pole piece 21 by a layer of glue 23. Thereafter two halves of the head mounting bracket are joined by screws 24 passing through opening assemblies 20.

Figure 1E:
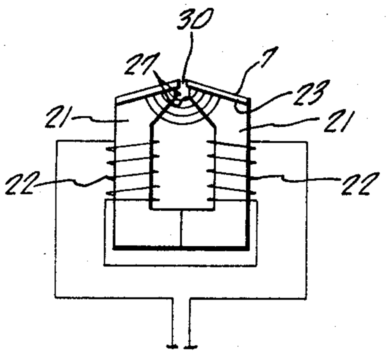
Figure 2A:
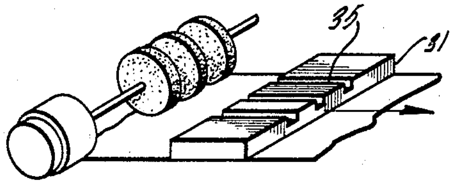
FIGS. 2A through FIG. 2D depict certain primary steps of the improved method of assembly of a pole tip support plate in accordance with the principles of this invention.
Figure 2B:
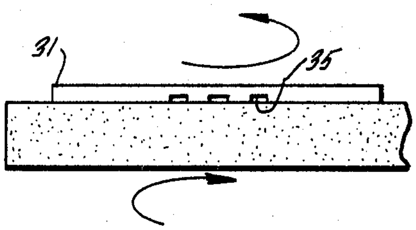
Figure 2C:
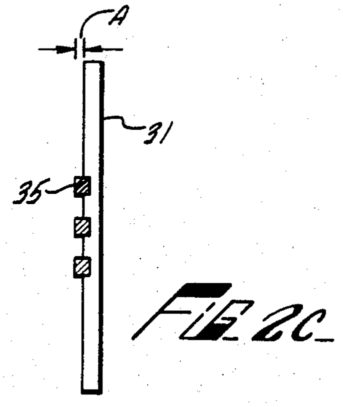
Figure 2D:
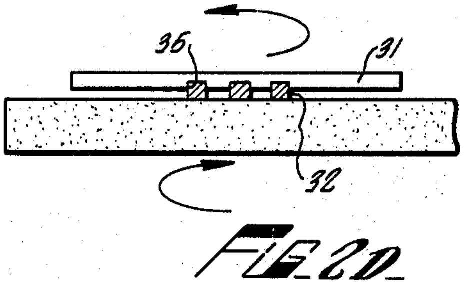

Shown in side elevation in FIG. 1E, is one magnetic circuit for one track of a plural track head. This magnetic circuit includes two pole piece halves 21 and a pair of tip members 7 which are bonded to the upper edge of the pole piece 21 by the foregoing mentioned layer of glue 23. This prior art magnetic circuit assembly further includes windings 22 which are wrapped in the manner shown in FIG. 1E around the pole pieces 21 in order to reproduce, as an electrical signal, any flux change induced in the magnetic circuit by passage of a magnetic medium over a gapped area.

This prior art magnetic circuit, in addition to having an objectionable glue layer 23, presents at edge surfaces 27 a high amount of flux leakage, which leakage seriously reduces the signal strength because a significant portion of the induced flux does not flow through pole pieces 21, but rather leaks across the gap 30 between pole tips 7 which are in essence magnetically isolated from pole pieces 21 by the nonmagnetic glue layer 23. Further, a portion of that flux which is induced into pole pieces 21 leaks across the flat parallel faces 27 of the pole pieces 21 rather than traversing the main body of the magnetic circuit for recovery by windings 22. These objections are not present in the head assembly of this invention for the reasons discussed in detail hereinafter.

In FIG. 2 a method of assembly, in accordance with the principles of this invention, which eliminates the objectionable glue line and also solves leakage problems between the pole tips and the pole piece assemblies is shown. This method of assembly comprises the steps of slotting a tip support plate 31 with parallel slots 35, FIG. 2A, for receiving pole tip members. Once this tip support plate is slotted it is next lapped, FIG. 2B, by any standard lapping technique to a predetermined slot depth which assures extension of the pole tips members 32 above the lapped surface when such members are inserted in the lapped tip support plate 31. Pole tips 32 are inserted in the slots 35, FIG. 2C, and are fixed in place by epoxy or other bonding material. Thereafter the tips and tip-support plate 31, 32 may be lapped, FIG. 2D, to establish a true flat plane for the downwardly extending edges of pole tips 32. This lapping operation of FIG. 2D provides assurance that these pole tips 32 will come into contact with their respective pole pieces as described hereinafter.

Figures 3A, 3B, 3C, 3D:
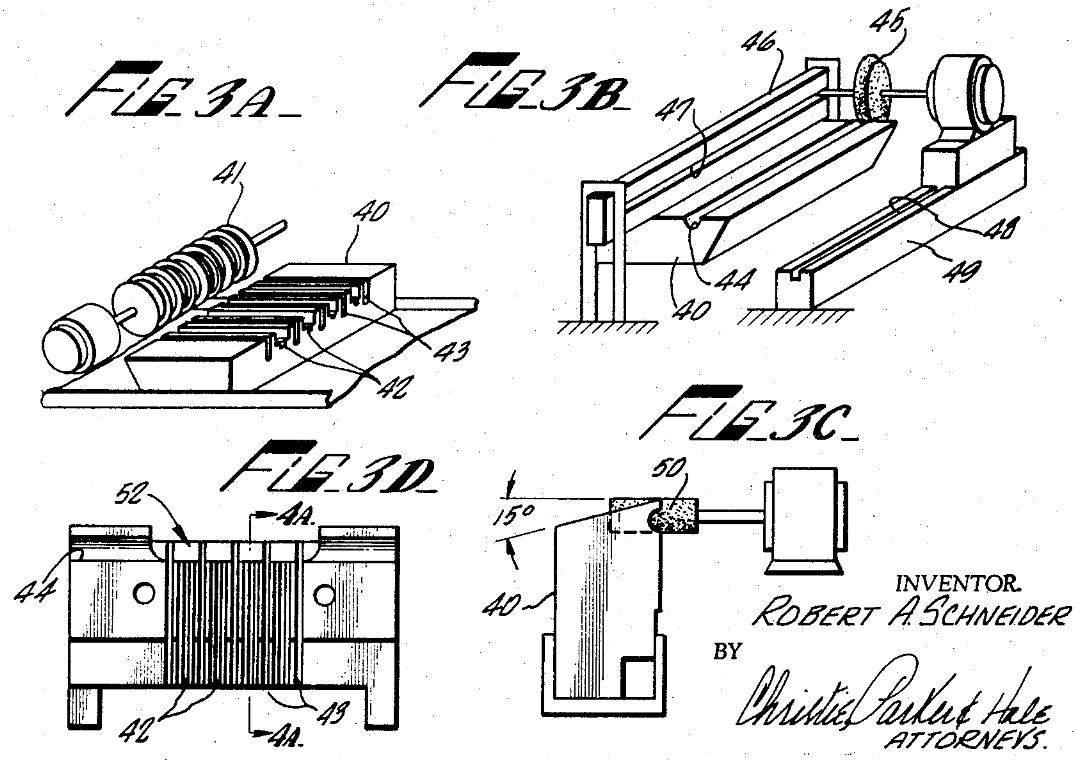
FIGS. 3A through FIG. 3D depict a new and improved configuration for a head housing bracket and further depict certain primary steps for its method of construction and assembly.

The steps of FIGS. 3A through FIG. 3D depict the machining operations for shaping a new and improved pole piece support assembly 40, shown in side elevation in FIG. 3C in accordance with the principles of this invention. This pole piece support assembly inititally starts as a rectangular blank 40 that is essentially one half of a gabled shape in that one edge of the rectangle is ground at an angle with respect to a horizontal of approximately 15°, FIG. 3C. This angle of course may vary depending upon the tape guidance requirement, but in general a 15° angle has proved satisfactory for the vast majority of tape guiding operations. This pole piece support assembly blank 40 is initially subjected to a slot grinding operation depicted in FIG. 3A wherein the blank 40 is slotted by a plurality of rotably turnable grinding wheels 41. These grinding wheels 41 are of two different widths and are chosen to mill out a plurality of parallel pole pieces receiving slots 42 in the pole piece supporting blank 40.

Located on each side of each pole piece slot 42 is a pair of thinner width isolating slots 43. These isolating slots 43 receive magnetic and electrostatic shielding material which prevents adjacent signal recovery operations from interfering with each other.

After the pole piece receiving slots 42 have been milled in the pole piece support assembly blank 40, a longitudinal semicircular groove 44 is ground along the length of the blank 40 immediately below the ridge portion of the half-gable shaped blank 40. This groove may be milled out by any well known operation, one of which is representatively shown in FIG. 3B, wherein a milling head 45 having a semi-circular milling edge is motor driven and guided along a grooved press bar 46 and guide bar 49. Bar 46 may be selectively spring loaded at each end in a manner that its bottom edge holds the assembly blank 40 in place as the milling wheel 45 is slid along the guide slots 47 and 48. This semicircular elongated groove 44 represents one half of an inlet and outlet port for potting material as will be described in more detail hereinafter.

In FIG. 3C the support assembly blank 40 is next subjected to a milling operation whereby a countersunk void 52, FIG. 3D, is located substantially at the midpoint of the supporting assembly 40 by a motor driven milling wheel 50, FIG. 3C. This void 52 removes a portion of the ridge from the support blank 40 and is of sufficient width as shown in FIG. 3D, to remove an upper portion of all of the pole piece slots 42. Further, this void is chosen with sufficient depth that it communicates fully with the remaining outside portions of the semicircular groove 44. The void area 52 in the pole piece support 40 of this invention represents a new and novel structure for housing the signal recovery coils which are wrapped around the pole piece assembly. Void 52 allows such coils to be positioned much closer to the gap in the pole pieces, which are of a selected shape such that induced flux is offered a low reluctance path through the magnetic circuit.

For example, in FIGS. 1C and 1D the prior art pole piece support assemblies 20 are shown with deep slots 28. Slots 28 serve to house the prior art coil windings 22. This slot 28, which is machined transverse to the edges of supports 20 to be joined, and below the ridged edge of each support assembly 20, forms a plurality of triangle shaped fingers which are located between the top of slot 28 and the ridge of assembly 20. These fingers are fragile and often were subject to bending and breakage with the result that they had to be rejected or replaced.

Figure 5A:
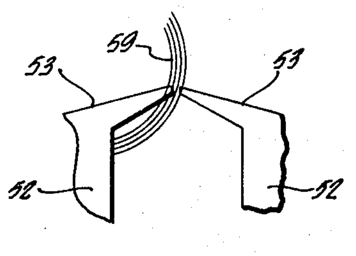
FIG. 5 and detail 5A depict an improved pole piece shape in accordance with the principles of this invention.
Figure 5:
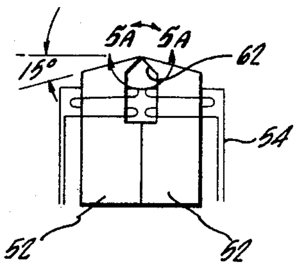

In FIG. 5 a pair of new and improved pole pieces 52 in accordance with this invention are shown as they would be joined in an assembled magnetic circuit without any pole tips in place. Each pole piece 52 has one half of an inverted V-shape cut in the edge nearest the center of the pole piece 52, which V-shaped cut, when a pair of such pole pieces are joined edge-to-edge as shown, forms two substantially opposed points of magnetic material. This opposed point arrangement is located immediately below and adjacent to the gap formed between a pair of pole tip plates. These pole pieces, by extending closer to the gap area than those of the prior art, take advantage of a fully contiguous relationship with the pole tip pieces which are directly seated, in the manner previously described, on upper surfaces 53. An improved low reluctance path for the short wave lengths of high frequency signals results from this improved shape and elimination of a glue layer between the pole tip and pole piece.

Figure 4A:
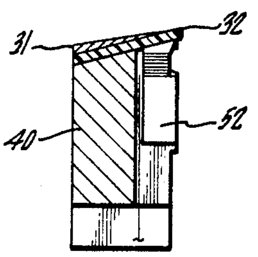
FIGS. 4A through FIG. 4C depict steps for assembling a tip support plate and a head housing bracket in accordance with the principles of this invention.

A plurality of pole pieces 52, shown in FIG. 5, are secured by cement in the pole piece support assembly 40 in the manner shown in FIG. 4A. Also shown in FIG. 4A is a side elevation of the combination of a lapped tip support plate 31 and pole piece assembly 40 cut at the line marked 4A in FIG. 3D. This top support plate 31, with a pole tip member 32 cemented in place, is positioned on the lapped surface of pole support assembly 40 so that the downwardly extending edges of tip member

Figure 4B:
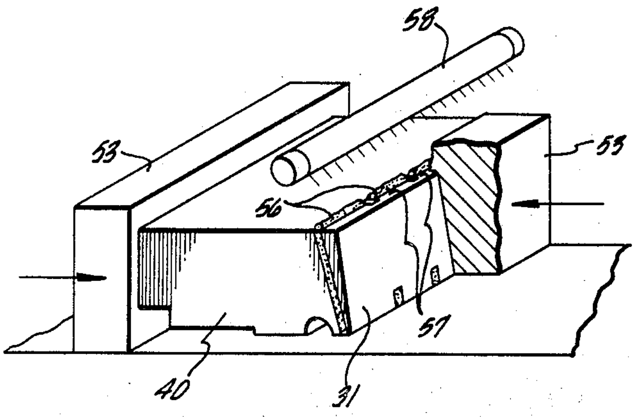

32 is in direct contact with the exposed edge of pole piece 52. Once these pole members 32 and 52 are fixed in their respective locations and all of the plurality of tip members 32 are alignably positioned in contact with each of their respective pole piece members 52, the members 31 and 40 are clamped in place by any well-known clamping block shown representatively as blocks 53 in FIG. 4B.

Figure 4C:
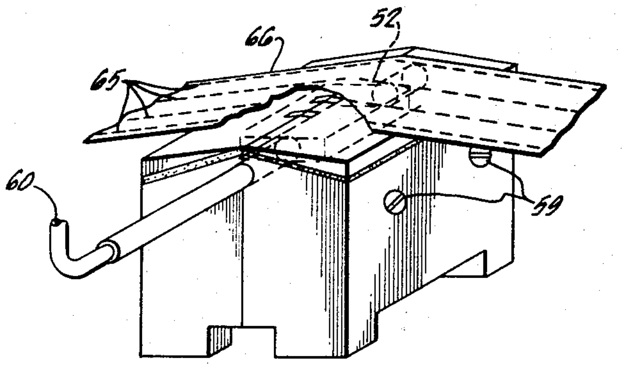

The method of assembly of this invention includes the step of placing a fillet 56 of epoxy or other suitable cement agent of any type which becomes slightly fluid at its curing temperature, across the tops of channels 57 which are formed by the space between the lapped tip support plate 31 which is raised from the face of pole support assembly 40 by the downwardly extending pole tip members 32. Thereafter the clamped members 31 and 40 and the fillet of epoxy 56 is heated by any suitable means such as the heating device 58. This heating device 58 and the environment, or chamber, for heating is chosen to warm the entire assembly to the curing temperature for the epoxy 56. At its curing temperature the epoxy resin assumes a fluid state and by capillary action fills in the foregoing mentioned channels 57 and thus bonds the tip support plate 31 to the face of the pole support assembly 40. This bond, of course, is achieved without any glue layer being present between the lapped edges of the pole tip members 32 and the pole piece members 52, which are clamped in contact throughout the warming process. A subsequent curing period is provided to allow the epoxy to set. Thereafter when two such assemblies have been bonded, in the manner described, they are placed together side-by-side as shown in FIG. 4C, and are fastened by screws 59 or any other suitable fastening means. Fastened in this position, a complete magnetic circuit per track is present within the head assembly. The void area 52 is subsequently filled by any well-known pressurized potting material by a suitable nozzle such as 60. As mentioned hereinbefore, this potting material rigidly supports each of the completed magnetic circuits in a manner which avoids any breaking of the completed magnetic circuits once the potting material hardens.

The assembled head of FIG. 4C is subjected to further lapping and polishing techniques. These techniques may include a contouring operation in which a predetermined radius is ground along the ridge formed by the two tip support plates 5. This contouring operation grinds away part of the unslotted edge of the tip support plate 31 until a very small portion of the tips 32 are exposed. The exposed portions of the tips 32 are that part of the magnetic circuit which comes in direct contact with the various channels 65 of a tape 66 which passes over the contoured portions of the assembled head and bracket assembly.

It is to be understood that the foregoing features and principles of this invention are merely descriptive, and that many departures and variations thereof are possible by those skilled in the art, without departing from the spirit and scope of this invention.

What is claimed is:

1. A head for recovering signals from a magnetic storage medium comprising support means for holding a first gapped magnetic material with one portion of the magnetic material on each side of the gap exposed for contact with the magnetic medium, said first magnetic material extending downwardly from said support means, a support bracket for housing a second gapped magnetic material with edges exposed in an upper surface plane of the bracket, said edges being aligned for contact with said downwardly extending first magnetic material, and bonding means joining only the lower surface of the support means to the upper surface of the housing bracket for completing a unitary magnetic circuit free of any of said bonding material.

2. A head for recovering signals from a magnetic storage medium comprising a nonmagnetic housing bracket of a shape substantially that of a peaked rectangular cube having two equal upper surface planes forming a ridge along the length of the barcket, a plurality of narrow slots cut in said bracket in parallel planes transversely oriented with said ridge, a countersunk hole extending beyond the parallel slots and bored substantially at the midpoint of the ridge, a plurality of gapped magnetic pole pieces one for each slot housed in the plurality of slots with the gapped portions thereof extending into the countersunk bore and with upper edges of the magnetic circuits on each side of the gap lying in the two upper surface planes of the housing bracket, a pair of flat beveled rectangular plates having slots alignably matching the slots in the housing bracket with one portion of all of the slots along a beveled length of the plate milled through the upper surface of the plate, magnetic tips seated in each slot in the pair of plates with an upper portion of each tip exposed in the milled through length of each plate for contact with a magnetic medium to be read and with the lower tip surfaces extending downwardly from the lower surface of each plate, bonding means for joining only the lower surface of the tip support plates to the upper surface of the housing bracket with the beveled lengths of the plate forming a gapped ridge and with the downwardly extending tip surfaces in intimate contact with the magnetic pole pieces for completing a unitary magnetic circuit free of any bonding materials, and potting material filling the countersunk bore area for magnetically isolating all the unitary magnetic circuits in said head.

3. A magnetic signal recovery head as defined in claim 2 wherein each one of said plurality of unitary magnetic circuits in an assembled head comprises a pair of magnetic tips and a pair of magnetic pole pieces formed into a flat peaked sheet of unitary magnetic material and having an inverted V-opening in the material with the point of the inverted opening forming an air gap defined by two pointed portions at the peak of the magnetic material.

4. A signal recovery head as defined in claim 3 wherein each of said magnetic circuits further comprises a signal recovery winding around the magnetic circuit at the base of the inverted V-shaped opening, said windings being housed in said countersunk bore and being held in isolated position from one another by said potting material.

References Cited

UNITED STATES PATENTS

| | | | |
|---|---|---|---|
| 3,335,412 | 8/1967 | Matsumoto | 340—174.1 |
| 3,041,413 | 6/1962 | Williams | 179—100.2 |

BERNARD KONICK, *Primary Examiner.*

A. I. NEUSTADT, *Assistant Examiner.*

U.S. Cl. X.R.

340—174.1